United States Patent [19]
Santure et al.

[11] Patent Number: 5,693,205
[45] Date of Patent: Dec. 2, 1997

[54] PROCESS FOR COATING ELECTRICALLY CONDUCTIVE SUBSTRATES, AN AQUEOUS COATING COMPOSITION, PROCESS FOR THE PREPARATION OF AN ADDUCT CONTAINING URETHANE GROUPS AND AN ADDUCT CONTAINING URETHANE GROUPS

[75] Inventors: David J. Santure, Novi, Mich.; Günther Ott, Münster, Germany; Udo Reiter, Telgte, Germany; Ulrich Heimann; Hans-Josef Oslowski, both of Münster, Germany

[73] Assignee: BASF Lacke + Farben, AG, Muenster-Hiltrup, Germany

[21] Appl. No.: 820,620
[22] PCT Filed: Jul. 20, 1990
[86] PCT No.: PCT/EP90/01189
§ 371 Date: Jan. 24, 1991
§ 102(e) Date: Jan. 24, 1991
[87] PCT Pub. No.: WO91/02035
PCT Pub. Date: Feb. 21, 1991

[30] Foreign Application Priority Data

Jul. 26, 1989 [DE] Germany .................... 39 24 694.9

[51] Int. Cl.$^6$ ........................................ C09D 5/44
[52] U.S. Cl. .................... 204/501; 204/509; 523/414; 525/440; 528/83; 528/85
[58] Field of Search ............... 525/440; 523/414; 528/83, 88; 204/181.7, 501, 509; 205/316, 317

[56] References Cited

U.S. PATENT DOCUMENTS 5,015,672  5/1991  Perner et al. .................... 523/415

OTHER PUBLICATIONS

Lee & Neville, Handbook of Epoxy Resins (1967), pp. 7–25.

*Primary Examiner*—James J. Seidleck
*Assistant Examiner*—D. Aylward

[57] ABSTRACT

The invention relates to a cathodic electro-dipping process, which comprises a procedure in which the electro-dipping primer used contains an adduct containing urethane groups which is obtainable by reacting with one another a polyester-polyol or polyether-polyol, a polyisocyanate and a compound which contains a hydroxyl group and at least one ketimine group in the molecule.

6 Claims, No Drawings

PROCESS FOR COATING ELECTRICALLY CONDUCTIVE SUBSTRATES, AN AQUEOUS COATING COMPOSITION, PROCESS FOR THE PREPARATION OF AN ADDUCT CONTAINING URETHANE GROUPS AND AN ADDUCT CONTAINING URETHANE GROUPS

The invention relates to a process for coating electrically conductive substrates in which
  (1) the electrically conductive substrate is dipped into an aqueous electro-dipping primer,
  (2) the substrate is connected as the cathode,
  (3) a film is deposited on the substrate by direct current,
  (4) the coated substrate is removed from the electro-dipping primer and
  (5) the film coat deposited is stored.

The invention also relates to an aqueous coating composition, a process for the preparation of an adduct containing urethane groups and an adduct containing urethane groups.

The cathodic electro-dipping process described above is known (compare, for example, DE-OS-3,518,732, DE-OS-3,518,770, EP-A-4,090, EP-A-12,463 and EP-A-262,069) and is used, in particular, for priming automobile bodies.

Coatings of outstanding quality can be obtained with the aid of the cathodic electro-dipping process—especially if electro-dipping primers containing cationic amine-modified epoxy resins as binders are used.

EP-A-262,069 discloses that the flexibility, impact resilience and stone-chip resistance of the resulting coatings can be improved by addition of adducts containing urethane groups to electro-dipping primers. However, the addition of the adducts containing urethane groups which are disclosed in EP-A-262,069 adversely lead to a reduction in the solvent resistance of the stoved films and to a reduction in the storage stability of the electro-dipping primers. The addition of the adducts containing urethane groups which are disclosed in EP-A-262,069 furthermore also has an adverse effect on the anticorrosion properties of the resulting coatings.

The object on which the present invention is based consists of providing a novel process according to the precharacterizing clause of patent claim 1, with which coatings which do not have the disadvantages of the prior art described above, or have them to a decreased extent, can be obtained.

This object is achieved, surprisingly, by a process according to the precharacterizing clause of patent claim 1, in which the aqueous electro-dipping primer contains an at least partly protonated adduct containing urethane groups which is obtainable by reacting with one another
  (A) a polyether- or polyester-polyol having a number-average molecular weight of 400 to 5000, preferably 600 to 2000, or a mixture of such polyether- and/or polyester-polyols,
  (B) a polyisocyanate or a mixture of polyisocyanates and
  (C) a compound which contains a hydroxyl group and at least one ketimine group in the molecule or a mixture of such compounds,
and at least partly protonating the primary amino groups formed after hydrolysis of the ketimine groups.

In comparison with the coatings produced according to EP-A-262,069, the coatings produced by the process according to the invention are superior in respect of solvent resistance, anticorrosion properties, flexibility, impact resilience, stone-chip resistance and adhesion to the substrate. Electro-dipping primers which contain the adducts containing urethane groups employed according to the invention moreover exhibit a better storage stability than electro-dipping primers which contain the adducts containing urethane groups which are disclosed in EP-A-262,069.

The electro-dipping primers employed according to the invention usually contain at least one synthetic resin which can be deposited cathodically, if appropriate at least one crosslinking agent and pigments, fillers, at least one grinding resin and other additives which are generally well known, such as foam suppressants, flow control auxiliaries and the like.

The electro-dipping primers employed according to the invention can in principle contain all the externally crosslinking or self-crosslinking synthetic resins which can be deposited cathodically and are suitable for the preparation of electro-dipping primers. The electro-dipping primers employed according to the invention can also contain mixtures of different synthetic resins which can be deposited cathodically.

However, the electro-dipping primers which contain cationic amine-modified epoxy resins as the synthetic resins which can be deposited cathodically are preferred. Both self-crosslinking and externally cross-linking cationic. amine-modified epoxy resins are known. Externally crosslinking cationic amine-modified epoxy resins are preferably employed.

Cationic amine-modified epoxy resins are understood as cationic reaction products of
  (a) optionally modified polyepoxides and
  (b) amines.

Polyepoxides are understood as compounds which contain two or more epoxide groups in the molecule.

Particularly preferred (a) components are compounds which can be prepared by reaction of
  (i) a diepoxide compound or a mixture of diepoxide compounds having an epoxide equivalent weight of less than 2000 with
  (ii) a compound which reacts monofunctionally with respect to epoxide groups under the given reaction conditions and contains a phenol or thiol group, or a mixture of such compounds,
components (i) and (ii) being employed in a molar ratio of 10:1 to 1:1, preferably 4:1 to 1.5:1, and the reaction of component (i) with component (ii) being carried out at 100° to 190° C., if appropriate in the presence of a catalyst (compare DE-OS-3,518,770).

Other particularly preferred (a) components are compounds which can be prepared by polyaddition of a diepoxide compound and/or of a mixture of diepoxide compounds, if appropriate together with at least one monoepoxide compound, which is carried out at 100° to 195° C., if appropriate in the presence of a catalyst, and is initiated by a starter which reacts monofunctionally and carries either an alcoholic OH group, a phenolic OH group or an SH group, to give an epoxy resin in which the diepoxide compound and starter are incorporated in a molar ratio of greater than 2:1 to 10:1 (compare DE-OS-3,518,732).

Polyepoxides which can be employed for the preparation of the particularly preferred (a) components and also themselves as (a) components are polyglycidyl ethers of polyphenols prepared from polyphenols and epihalohydrins. Bisphenol A and bisphenol F, for example, can especially preferably be employed as the polyphenols. 4,4'-Dihydroxybenzophenone, bis-(4-hydroxyphenyl)-1,1-ethane, bis-(4-hydroxyphenyl)-1,1-isobutane, bis-(4- hydroxy-tert.-butylphenyl)-2,2-propane, bis-(2-hydroxy-naphthyl)-methane, 1,5-dihydroxynaphthalene and phenolic novolak resins are furthermore also suitable.

Other suitable polyepoxides are polyglycidyl ethers of polyhydric alcohols, such as, for example, ethylene glycol, diethylene glycol, triethylene glycol, 1,2-propylene glycol, 1,4-propylene glycol, 1,5-pentane-diol, 1,2,6-hexanetriol, glycerol and 2,2-bis-(4-hydroxy-cyclohexyl)-propane.

It is also possible to employ polyglycidyl esters of polycarboxylic acids, such as, for example, oxalic acid, succinic acid, glutaric acid, terephthalic acid, 2,6-naphthalenedicarboxylic acid and dimerized linoleic acid. Typical examples are glycidyl adipate and glycidyl phthalate.

Hydantoin epoxides, epoxidized polybutadiene and polyepoxide compounds which are obtained by epoxidization of an olefinically unsaturated aliphatic compound are furthermore suitable.

Modified polyepoxides are understood as polyepoxides in which some of the reactive groups have been reacted with a modifying compound.

Examples which are mentioned of modifying compounds are:

a) compounds containing carboxyl groups, such as saturated or unsaturated monocarboxylic acids (for example benzoic acid, linseed oil fatty acid, 2-ethylhexanoic acid and versatic acid), aliphatic, cycloaliphatic and/or aromatic dicarboxylic acids of various chain lengths- (for example adipic acid, sebacic acid, isophthalic acid or dimeric fatty acids), hydroxyalkylcarborylic acids (for example lactic acid or dimethylolpropionic acid) and polyesters containing carboxyl groups, or b) compounds containing amino groups, such as diethylamine or ethylhexylamine or diamines having secondary amino groups, for example N,N'-dialkylalkylenediamines, such as dimethylethylenediamine, N,N'-dialkyl-polyoxyalkyleneamines, such as N,N'-dimethylpolyoxy-propylenediamine, cyanoalkylated alkylenediamines, such as bis-N,N'-cyanoethyl-ethylenediamine, cyanoalkylated polyoxyalkyleneamines, such as bis-N,N'-cyanoethylpolyoxypropylenediamine, polyaminoamides, such as, for example, versamides, in particular reaction products, containing terminal amino groups, of diamines (for example hexamethylenediamine), polycarboxylic acids, in particular dimeric fatty acids, and monocarboxylic acids, in particular fatty acids, or the reaction product of one mol of diaminohexane with two mol of monoglycidyl ethers or monoglycidyl esters, specifically glycidyl esters of . . .-branched (sic) fatty acids, such as of versatic acid, or c) compounds containing hydroxyl groups, such as neopentyl glycol, bis-ethoxylated neopentyl glycol, neopentyl glycol hydroxypivalate, dimethylhydantoin-N,N'-diethanol, hexane-1,6-diol, hexane-2,5-diol, 1,4-bis-(hydroxymethyl)cyclohexane, 1,1-isopropylidene-bis-(p-phenoxy)-2-propanol, trimethylolpropane, pentaerythritol or amino-alcohols, such as triethanolamine or methyldiethanolamine, or alkyl ketimines containing hydroxyl groups, such as aminomethylpropane-1,3-diol-methyl-isobutyl ketimine or tris-(hydroxymethyl)-aminomethane-cyclohexanone ketimine, and also polyglycol ethers, polyester-polyols, polyether-polyols, polycaprolactone-polyols and polycaprolactam-polyols of different functionality and molecular weights, or d) saturated or unsaturated fatty acid methyl esters which are transesterified with hydroxyl groups of the epoxy resins in the presence of sodium methylate.

Primary and/or secondary amines can be employed as component (b).

The amine should preferably be a water-soluble compound. Examples of such amines are mono- and dialkylamines, such as methylamine, ethylamine, propylamine, butylamine, dimethylamine, diethylamine, dipropylamine, methylbutylamine and the like. Alkanolamines, such as, for example, methylethanolamine, diethanolamine and the like, are likewise suitable. Dialkylaminoalkylamines, such as, for example, dimethylaminoethylamine, diethylaminopropylamine, dimethylaminopropylamine and the like, are furthermore suitable. Low molecular weight amines are used in most cases, but it is also possible to use higher molecular weight monoamines.

The amines can also additionally contain other groups, but these should not interfere with the reaction of the amine with the epoxide group and also should not lead to gelling of the reaction mixture.

Secondary amines are preferably employed as (b) components.

The charges required for water-dilutability and electrodeposition can be produced by protonation using water-soluble acids (for example boric acid, formic acid, lactic acid or preferably acetic acid).

Another possibility for introducing cationic groups into component (a) comprises the reaction of epoxide groups of component (a) with amine salts.

The cationic amine-modified epoxy resins can be employed either as externally crosslinking synthetic resins or as self-crosslinking synthetic resins. Self-crosslinking cationic amine-modified epoxy resins can be obtained, for example, by chemical modification of cationic amine-modified epoxy resins. A self-crosslinking system can be obtained, for example, by reacting the cationic amine-modified epoxy resin with a partly blocked polyisocyanate which contains on average one free isocyanate group per molecule and in which the blocked isocyanate groups are deblocked only at elevated temperatures.

Preferred electro-dipping primers are obtained when externally crosslinking cationic amine-modified epoxyresins are employed, in combination with a suitable crosslinking agent, as the synthetic resins which can be deposited cathodically.

Examples of suitable crosslinking agents are phenoplasts, polyfunctional Mannich bases, melamine resins, benzoguanamine resins, blocked polyisocyanates and compounds which contain at least two groupings of the general formula $R^1$—O—CO—.

The radical $R^1$ denotes (sic):

$R^1 = R^2O$—CO—$CH_2$—, $R^3$—CHOH—$CH_2$ or $R^4$—CHOR$^5$—CHOH—$CH_2$—

$R^2$=alkyl $R^3$=H, alkyl, $R^6$—O—$CH_2$ or $R^6$—CO—O—$CH_2$—

$R^4$=H or alkyl $R^5$=H, alkyl or aryl $R^6$=alkyl, cycloalkyl or aryl

Preferred electro-dipping primers are obtained when blocked polyisocyanates are employed as crosslinking agents.

Any desired polyisocyanates in which the isocyanate groups have been reacted with a compound such that the blocked polyisocyanate formed is stable towards hydroxyl and amino groups at room temperature, but reacts at elevated temperatures, as a rule in the range from about 90° C. to about 300° C., can be used as the blocked polyisocyanates. Any desired organic polyisocyanates suitable for crosslinking can be used in the preparation of the blocked polyisocyanates. The isocyanates which contain about 3 to 36, in particular about 8 to 15, carbon atoms are preferred. Examples of suitable diisocyanates are hexamethylene diisocyanate, toluylene 2,4-diisocyanate, toluylene 2,6-diisocyanate and 1-isocyanatomethyl-5-isocyanato-1,3,3-trimethylcyclohexane. Polyisocyanates having a higher isocyanate functionality can also be used. Examples of these are trimerized hexamethylene diisocyanate and trimerized isophorone diisocyanate. Mixtures of polyisocyanates can furthermore also be used. The organic polyisocyanates which are suitable as crosslinking agents in the invention can also be prepolymers which are derived, for example, from a polyol, including a polyether-polyol or a polyester-polyol.

Any desired suitable aliphatic, cycloaliphatic or aromatic alkyl monoalcohols can be used for blocking the polyisocyanates. Examples of these are aliphatic alcohols, such as methyl, ethyl, chloroethyl, propyl, butyl, amyl, hexyl, heptyl, octyl, nonyl, 3,3,5-trimethylhexyl, decyl and lauryl alcohol; cycloaliphatic alcohols, such as cyclopentanol and cyclohexanol; and aromatic alkyl alcohols, such as phenylcarbinol and methylphenylcarbinol.

Other suitable blocking agents are hydroxyamines, such as ethanolamine, oximes, such as methyl ethyl ketone oxime, acetone oxime and cyclohexanone oxime, or amines, such as dibutylamine and diisopropylamine. The polyisocyanates and blocking agents mentioned can also be used in suitable proportions for the preparation of the abovementioned partly blocked polyisocyanates.

The crosslinking agent is as a rule employed in an amount of 5 to 60% by weight, preferably 20 to 40% by weight, based on the cationic amine-modified epoxy resin.

It is essential to the invention that, in the process in question, an electro-dipping primer is employed which contains an at least partly protonated adduct which contains urethane groups and is obtainable by reacting with one another (A) a polyether- or polyester-polyol having a number-average molecular weight of 400 to 5000, preferably 600 to 2000, or a mixture of such polyether- and/or polyester-polyols, (B) a polyisocyanate or a mixture of polyisocyanates and (C) a compound which contains a hydroxyl group and at least one ketimine group in the molecule or a mixture of such compounds, and at least partly protonating the primary amino groups formed after hydrolysis of the ketimine groups.

The reaction of components (A), (B) and (C) can be carried out either in bulk or in a solvent or solvent mixture which is inert toward isocyanate groups, if appropriate at elevated temperatures, preferably at 40° to 100° C. The reaction can be catalyzed by addition of catalysts, such as, for example, dibutyl-tin dilaurate.

The components are reacted with one another in proportions such that 0.75 to 1.5, preferably 0.9 to 1.1 and particularly preferably 1.0 equivalents of hydroxyl groups are present per equivalent of isocyanate groups. If a polyether- or polyester-diol is employed as component (A) and a diisocyanate is employed as component (B), n mol of component (A), n+1 mol of component (B) and 2 mol of component (C) are preferably reacted with one another.

It is preferable to employ a polyether- or polyester-diol or a mixture of polyether- and/or polyester-diols as component (A) and a diisocyanate or a mixture of diisocyanates as component (B). Polyether- and/or polyester-polyols and/or polyisocyanates of higher functionality can also be employed. In such cases, however, it should be ensured—for example by admixing monofunctional reaction partners—that no gelling of the reaction mixture occurs.

There are several possibilities for the sequence in which components (A), (B) and (C) can be reacted: thus, for example, a prepolymer containing terminal isocyanate groups can be prepared from components (A) and (B) in a first stage, and its isocyanate groups can then be reacted with component (C) in a second stage. However, it is also possible for components (A) and (C) to be initially introduced into the reaction vessel and for component (B) to be added slowly. A third less preferred variant comprises preparing a precursor containing isocyanate groups from components (B) and (C) in a first stage and then reacting this with component (A) in a second stage.

The product obtained after reaction of components (A), (B) and (C) is hydrolyzed and the primary amino groups formed during this hydrolysis are at least partly protonated. This is advantageously effected by addition of water and acid to the reaction product obtained from (A), (B) and (C). The aqueous dispersion thus obtained can then be incorporated into the aqueous electro-dipping primer. It is of course also possible for the reaction product prepared from (A), (B) and (C) to be dispersed in water in the presence of an acid, together with the synthetic resin which can be deposited cathodically and is described above, and for the dispersion thus obtained to be further processed to an aqueous electro-dipping primer. It is moreover possible for the reaction product obtained from (A), (B) and (C) to be added to the aqueous dispersion of the synthetic resin which can be deposited cathodically and is described above or to the finished aqueous electro-dipping primer. The reaction product obtained from (A), (B) and (C) is hydrolyzed in the aqueous dispersion or in the aqueous electro-dipping primer and protonated by the acid present in the dispersion or in the electro-dipping primer. In some cases it may be necessary to add a little more acid to the dispersion or the electro-dipping primer.

A polyether- or polyester-polyol having a number-average molecular weight of 400 to 5000, preferably 600 to 2000, or a mixture of such polyether- and/or polyester-polyols is employed as component (A). A polyether- or polyester-diol having a number-average molecular weight of 400 to 5000, preferably 600 to 2000, or a mixture of such polyether- and/or polyester-diols is preferably employed as component (A). Polyether-diols having a number-average molecular weight of 400 to 5000, preferably 600 to 2000, are particularly preferably employed as component (A).

Examples which are mentioned of suitable polyether-polyols are aliphatic polyether-diols of the general formula H—(O(CHR)$_n$—)$_m$OH. R=hydrogen or a lower alkyl radical, n=2 to 6, preferably 3 to 4, and m=2 to 100, preferably 5 to 50. Linear or branched polyether-polyols, such as poly(ethylene oxide), poly(propylene oxide), poly (butylene oxide) and/or polyether-polyols obtainable by copolymerization of ethylene oxide with propylene oxide can be employed as component (A).

Poly(propylene oxide) and copolymers of ethylene oxide and propylene oxide having a number-average molecular weight of 600 to 2000 are particularly preferably employed as component (A).

It is of course also possible to employ mixtures of different polyether-polyols as (A) components.

Polyester-polyols, in particular polyester-diols having a number-average molecular weight of 400 to 5000, preferably 600 to 2000, can also be employed as component (A).

Polyester-diols are prepared by esterification of organic dicarboxylic acids or their anhydrides with organic diols, or are derived from a hydroxycarboxylic acid or a lactone. To prepare branched polyester-polyols, polyols or polycarboxylic acids having a higher functionality can be employed in a small amount. The dicarborylic acids and diols can be linear or branched aliphatic, cycloaliphatic or aromatic dicarboxylic acids or diols.

The diols used to prepare the polyesters comprise, for example, alkylene glycols, such as ethylene glycol, propylene glycol, butylene glycol, butane-1,4-diol, hexane-1,6-diol and neopentyl glycol, and other diols, such as dimethylolcyclohexane. The acid component of the polyester primarily comprises lower molecular weight dicarboxylic acids or their anhydrides having 2 to 30, preferably 4 to 18, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids, it is also possible to use their anhydrides, if these exist. Relatively small amounts of carboxylic acids containing 3 or more carboxyl groups, for example trimellitic anhydride or the adduct of maleic anhydride on unsaturated fatty acids, can also be present during the formation of polyester-polyols.

Polyester-diols which are obtained by reaction of a lactone with a diol are also employed according to the invention. They are distinguished by the presence of a terminal hydroxyl group and recurring polyester portions of the formula (—CO—(CHR)$_n$—CH$_2$—O—). In this formula, n is preferably 4 to 6 and the substituent R is hydrogen or an alkyl, cycloalkyl or alkoxy radical. No substituent contains more than 12 carbon atoms. Examples which are mentioned are poly(hydroxycaproic acid), poly(hydroxybutyric acid), poly(hydroxydecanoic acid) and poly(hydroxystearic acid). The lactone used as the starting material can be represented by the following general formula

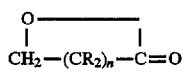

in which n and R have the meaning already given. Unsubstituted...-caprolactone (sic), in which n has the value 4 and all the R substituents are hydrogen, is preferred for the preparation of the polyester-diols. The reaction with the lactone is started by low molecular weight polyols, such as ethylene glycol, 1,3-propanediol, 1,4-butanediol or dimethylolcyclohexane. However, it is also possible for other reaction components, such as ethylenedieumine, alkyldialkanolamines or even urea, to be reacted with caprolactone.

Aliphatic, cycloaliphatic and/or aromatic polyisocyanates containing at least two isocyanate groups per molecule can be employed as component (B). Diisocyanates are preferably employed as component (B). Suitable aromatic diisocyanates are phenylene diisocyanate, toluylene diisocyanate, xylylene diisocyanate, biphenylene diisocyanate, naphthylene diisocyanate and diphenylmethane diisocyanate.

Because of their good stability toward ultra-violet light, (cyclo)aliphatic diisocyanates give products having a low tendency to yellow. Examples of these are isophorone diisocyanate, cyclopentylene diisocyanate and the hydrogenation products of the aromatic diisocyanates, such as cyclohexylene diisocyanate, methylcyclohexylene diisocyanate and dicyclohexylmethane diisocyanate. Aliphatic diisocyanates are compounds of the formula OCN—(CR$_2$)$_r$—NCO, wherein r is an integer from 2 to 20, in particular 6 to 8, and R, which can be identical or different, represents hydrogen or a lower alkyl radical having 1 to 8 C atoms, preferably 1 or 2 C atoms. Examples of these are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Isophorone diisocyanate and dicyclohexylmethane diisocyanate are particularly preferred diisocyanates.

Mixtures of different polyisocyanates can of course also be employed.

Compounds which contain a hydroxyl group and at least one ketimine group in the molecule are employed as component (C). These compounds can be obtained by generally well known methods by reaction of compounds containing a hydroxyl group and at least one primary amino group in the molecule with ketones. Examples which are mentioned of compounds which contain a hydroxyl group and at least one primary amino group in the molecule are compounds of the general formula H$_2$N—CR$_1$R$_2$—R$_3$—O(CHR$_4$—CHR$_5$—O)$_n$H. In this formula, R$_1$ and R$_2$ represent hydrogen or alkyl or —CH$_2$OH groups, R$_3$ represents a linear or branched alkylene radical, in particular an alkylene radical having 1 to 3 carbon atoms, R$_4$ and R$_5$ represent hydrogen or alkyl radicals having 1 to 4 carbon atoms and n=0–5. Concrete examples which are mentioned of compounds which contain a hydroxyl group and at least one primary amino group in the molecule and which can be employed are: ethanolamine, propanolamine, butanolamine, 2-amino-2-methylpropan-1-ol (H$_2$N—C(CH$_3$)$_2$—CH$_2$OH), 2-amino-2-ethylpropan-1-ol and ethoxylated and/or propoxylated ethanolamine or propanolamine, such as, for example, 2,2'aminoethoxyethanol (H$_2$N—CH$_2$—CH$_2$—O—CH$_2$—CH$_2$—OH) and diethylene glycol mono(3-aminopropyl) ether (H$_2$N—(CH$_2$)$_3$—O—CH$_2$—CH$_2$—O—CH$_2$—CH$_2$—OH).

Aminophenols can also be employed. However, these are less preferred. The primary amino groups of the compounds containing a hydroxyl group and at least one primary amino group in the molecule are converted into ketimine groups by generally well known methods (compare, for example, DE-OS-3,519,953) using ketones. Ketones which can be employed are, for example: acetone, methyl ethyl ketone, diethyl ketone, methyl propyl ketone, methyl isopropyl ketone, methyl n-butyl ketone, methyl isobutyl ketone, ethyl isopropyl ketone, cyclohexanone, cyclopentanone and acetophenone. Particularly preferred ketones are acetone, methyl ethyl ketone and methyl isobutyl ketone. The compounds which contain a hydroxyl group and at least one ketimine group in the molecule and are obtained in this manner can then be employed as component (C) for the preparation of the adducts which contain urethane groups and are employed according to the invention.

The adducts which contain urethane groups and are employed according to the invention are incorporated into the electro-dipping primers according to the invention in amounts such that the electro-dipping primers contain 1 to 45% by weight, preferably 1 to 25% by weight, based on the total amount of synthetic resin which can be deposited cathodically and—if present—crosslinking agent and grinding resin contained in the electro-dipping primer, of the adduct containing urethane groups.

It is of course also possible for mixtures of adducts containing urethane groups to be employed in the electro-dipping primers.

The electro-dipping primers employed according to the invention are prepared by generally well known methods. The synthetic resins which can be deposited cathodically are synthesized in organic solvents by well known methods (compare, for example, DE-OS-3,518,732, DE-OS-3,518, 770, EP-A-4,090 and EP-A-12,463). The synthetic resin solutions or dispersions thus obtained are converted in neutralized form into an aqueous phase.

Pigments are incorporated in the form of a pigment paste into the aqueous dispersion of the resins which can be deposited cathodically.

The preparation of pigment pastes is generally known and does not need to be illustrated in more detail here (compare D. H. Parker, Principles of Surface Coating Technology, Interscience Publishers, New York (1965); R. L. Yates, Electropainting, Robert Draper Ltd., Teddington/England (1966); and H. F. Payne, Organic Coating Technology, Volume 2, Wiley and Sons, New York (1961)).

The pigment pastes can in principle contain all the pigments suitable for electro-dipping primers. In general, titanium dioxide is the only or the main white pigment. However, other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate, can also be used. Colored pigments which can be used are, for example, cadmium yellow, cadmium red, carbon black, phthalocyanine blue, chromium yellow, toluidyl red and hydrated iron oxide.

The pigment paste can also additionally contain plasticizers, fillers, wetting agents and the like, as well as the pigments.

The amount of pigment paste added to the aqueous dispersion of the synthetic resin which can be deposited cathodically is such that the finished electro-dipping primer has the properties required for the deposition. In most cases the weight ratio between the pigment and synthetic resin which can be deposited cathodically is 0.05 to 0.5.

The electro-dipping primers employed according to the invention can also contain other customary additives, such as, for example, additional solvents, antioxidants, surface-active agents and the like, in addition to the synthetic resin which can be deposited cathodically, the pigment paste and the adduct containing urethane groups.

The solids content of the electro-dipping primers employed according to the invention is preferably 7 to 35 parts by weight, particularly preferably 12 to 25 parts by weight. The pH of the electro-dipping primers is between 4 and 8, preferably between 5 and 7.5.

The electro-dipping primer is brought into contact with an electrically conductive anode and with the electrically conductive substrate connected as the cathode. When an electric current passes between the anode and cathode, a firmly adhering film coat is deposited on the cathode.

The voltage applied can vary within a wide range and can be, for example, between two and a thousand volt. However, voltages between 50 and 500 volt are typically used. The current density is as a rule between about 10 and 100 amperes/m$^2$. The current density tends to decrease in the course of the deposition.

After the deposition, the coated object is rinsed off and is ready for stoving.

The film coat deposited are in general stoved at temperatures of 130° to 200° C. over a period of 10 to 60 minutes, preferably at 150° to 180° C. over a period of 15 to 30 minutes.

The process according to the invention can be used for coating any desired electrically conductive substrates, but in particular for coating metals, such as steel, aluminum, copper and the like.

The aqueous coatings according to the invention can also be applied by spraying, brushing, knife-coating and the like both to electrically conductive and to electrically non-conductive substrates.

The invention is illustrated in more detail in the following examples. All the parts and percentage data are weight data, unless expressly stated otherwise.

1. Preparation of adducts containing urethane groups
1.1 Preparation of compounds containing a hydroxyl group and at least one ketimine group in the molecule.

1.1.1 Ketimine I 1,100 g of 2,2'-aminoethoxyethanol ($H_2N$—$CH_2$—$CH_2$—O—$CH_2$—$CH_2$—OH) and 1,886 g of methyl isobutyl ketone (MIBK) are initially introduced into a suitable reactor with a stirrer, inert gas inlet, water separator and reflux condenser and are heated up to 110° C. under nitrogen. The first water of reaction is removed from the circulation, the temperature is increased to 140° C. in small steps and the mixture is kept at this temperature until 189 g of water have been removed from the circulation. The mixture is cooled to 40° C. and the product is discharged under a nitrogen atmosphere. The solution has an amine equivalent of 265.

1.1.2 Ketimine II 836 g of ethanolamine and 2,210 g of methyl isobutyl ketone are reacted in the manner described under 1.1.1 until 150 g of water have been removed from the circulation. The solution has an amine equivalent of 200.

1.2 Preparation of the adducts 1.2.1 Adduct I 900 g of Pluriol P600[1] and 265 g of ketimine I are heated up to 60° C. under a nitrogen atmosphere in a reaction vessel. 0.8 g of dibutyl-tin dilaurate is added and 530.8 g of Desmodur W[2] are added dropwise, while stirring, so that the temperature does not rise above 70° C. (90 minutes). The temperature is further maintained for another 30 minutes, until free isocyanate groups are no longer detectable in the IR spectrum. The mixture is then diluted with 331 g of methyl isobutyl ketone and the product is discharged.

[1] Polypropylene glycol of molecular weight 600 (BASF)
[2] Dicyclohexylmethane diisocyanate, NCO equivalent weight 132.7 (Bayer).

1.2.2 Adduct II

The substances listed below are reacted in the manner described in 1.2.1:344 g of Pluriol P600, 600 g of Voranol P2000[1], 152 g of kerimine I, 0.7 g of dibutyltin dilaurate, 305 g of Desmodur W, 68 g of butylglycol and 229 g of methyl isobutyl ketone

[1] Polypropylene glycol of molecular weight 2090 (DOW Chemical).

1.2.3 Adduct III

The substances listed below are reacted in the manner described in 1.2.1:653 g of Voranol P2000, 55 g of ketimine I, 0.4 g of dibutyl-tin dilaurate, 110 g of Desmodur W, 40 g of butylglycol and 145 g of methyl isobutyl ketone.

1.2.4 Adduct IV

The substances listed below are reacted in the manner described in 1.2.1:1404 g of Pluriol P900[1], 310 g of ketimine I, 248 g of methyl isobutyl ketone, 1.1 g of dibutyl-tin dilaurate, 613 g of Desmodur W, 112 g of butylglycol and 113 g of methyl isobutyl ketone.

[1] Polypropylene glycol of molecular weight 900 (BASF)

1.2.5 Adduct V

The substances listed below are reacted in the manner described in 1.2.1:851 g of polycaprolactonediol (OH number 198), 200 g of ketimine II, 0.7 g of dibutyltin dilaurate, 444 g of isophorone diisocyanate and 302 g of methyl isobutyl ketone.

2. Preparation of electro-dipping primers according to the invention

2.1 Preparation of a binder 1,805 parts of a liquid epoxy resin based on bisphenol A and having an epoxide equivalent weight of 188, together with 352 parts of nonylphenol, 67 parts of xylene and 10 parts of dimethyllaurylamine, are initially introduced into a reaction vessel with a stirrer, reflux condenser, internal thermometer and nitrogen inlet. The reaction mixture is heated to 130° C. and kept at this temperature until the epoxide equivalent weight has reached a value of 450. A 71.3% strength solution of ethanolamine-methyl isobutyl ketimine in methyl isobutyl ketone is added dropwise at this temperature in the course of one hour. The reaction is further maintained for another 7 hours, before the mixture is diluted to a solids content of 83.5% (1 hour at 130° C.) with 141 parts of hexylglycol. The resin has an MEQ base value of 1.68 milliequivalents/g of solid resin.

2.2 Preparation of a crosslinking agent

A blocked isocyanate crosslinking agent (polyurethane crosslinking agent) is prepared in accordance with DE-OS 2,701,002, Example 1, by slowly adding 218 parts of 2-ethylhexanol to 291 parts of an 80/20 isomer mixture of toluylene 2,4-/2,6-diisocyanate in a nitrogen atmosphere, while stirring, the reaction temperature being kept below 38° C. by external cooling. The mixture is further kept at 38° C. for another half an hour and then heated to 60° C., after which 75 parts of trimethylolpropane and then 0.08 part of dibutyl-tin dilaurate, as a catalyst are added. After an exothermic reaction at the start, the mixture is kept at 121° C. for 1.5 hours, until essentially all the isocyanate groups have been consumed, which can be detected from the infrared spectrum. The mixture is then diluted with 249 parts of ethylene glycol monoethyl ether.

2.3 Preparation of aqueous binder dispersions

2.3.1 Dispersion I 898 parts of the binder prepared according to 2.1 are mixed intensively with 528 parts of the crosslinking agent prepared according to 2.2, 8 parts of dibutyl-tin dilaurate, 1.2 parts of a foam suppressant solution (50% strength solution of Surfynol® [Air Products] in butylglycol), 33.7 parts of glacial acetic acid and 780 parts of deionized water. After homogenizing for 20 minutes, the mixture is diluted with 1,760 parts of deionized water in portions. The dispersion is then subjected to vacuum distillation until it has a solids content of 28.5% by weight (60 minutes, 130° C.). A mixture of 178 parts of adduct I (compare 1.2.1), 8.7 parts of glacial acetic acid and 232 parts of deionized water is stirred into 4,500 parts of this dispersion.

2.3.2 Dispersion II

Dispersion II is prepared like dispersion I. 178 parts of adduct II (compare 1.2.2) are employed instead of 178 parts of adduct I, and 3.0 parts of glacial acetic acid are employed instead of 8.7 parts of glacial acetic acid.

2.3.3 Dispersion III

Dispersion III is prepared like dispersion I. 283.0 parts of adduct III (compare 1.2.3) are employed instead of 178 parts of adduct I, 2.9 parts of glacial acetic acid are employed instead of 8.7 parts of glacial acetic acid and 417.0 parts of deionized water are employed instead of 232 parts of deionized water.

2.3.4 Dispersion IV

Dispersion IV is prepared like dispersion I. 400.8 parts of adduct IV (compare 1.2.4) are employed instead of 178 parts of adduct I, 5.3 parts of glacial acetic acid are employed instead of 8.7 parts of glacial acetic acid and 621.9 parts of deionized water are employed instead of 232 parts of deionized water.

2.3.5 Dispersion V

Dispersion V is prepared like dispersion I. 139.4 parts of adduct V (compare 1.2.5) are employed instead of 178 parts of adduct I, 2.7 parts of glacial acetic acid are employed instead of 8.7 parts of glacial acetic acid and 164.9 parts of deionized water are employed instead of 232 parts of deionized water.

2.4 Preparation of a gray pigment paste 27.81 parts of bisphenol A diglycidyl ether, 1.44 parts of xylene and 5.81 parts of bisphenol A are reacted in the presence of 0.002 part of triphenylphosphine at 150°–160° C. up to an epoxide equivalent weight of 345. The mixture is then diluted with 21.61 parts of butylglycol and cooled to 49° C. A mixture of 7.77 parts of 9-amino-3,6-dioxanonan-1-ol and 4.07 parts of N,N-dimethylaminopropylamine is then added in the course of 6 minutes, after which the temperature rises to 110° C. The mixture is kept at between 110° and 115° C. for 1 hour, before 6.45 parts of butylglycol are added and the mixture is cooled to 77° C. 14.9 parts of nonylphenol glycidyl ether are then added. Thereafter, the temperature rises to 90° C., and is kept at this level for 1 hour, before the mixture is diluted with 10.03 parts of butylglycol and cooled. The solids content of the mobile resin solution is 60%.

To prepare the pigment paste, 29.33 parts of water, 1.59 parts of acetic acid (90% strength) and 21.60 parts of the resin solution described above are first premixed. 0.7 part of foam suppressant[1], 0.5 part of carbon black, 4.8 parts of basic lead pigment, 6.75 parts of extender HEWP[2], 32.48 parts of titanium dioxide (R900) and 2.25 parts of dibutyl-tin oxide are now added and the mixture is predispersed under a high-speed dissolver stirrer for 30 minutes. The mixture is then dispersed in a small laboratory mill (Motor Mini Mill, Eiger Engineering Ltd., Great Britain) for 1 to 1.5 hours down to a Hegmann fineness of less than/equal to 12 and finely adjusted to the desired processing viscosity with further water.

[1] "Tristar Antifoam" Tristar Chemical Co., Dallas, USA
[2] English China Clay Int., Great Britain A pigment paste which is very stable towards demixing results.

2.5 Preparation of electro-dipping primers according to the invention and depositions 1,800 parts of deionized water are initially introduced into a suitable vessel and 4 parts of 10% acetic acid are added. 2,328 parts of the binder dispersion and 640 parts of the pigment paste are stirred into this mixture and the mixture is topped up with 228 parts of deionized water. Before the depositions, the primer baths are aged for 10 days, while stirring.

Deposition of the film coats is carried out on a zinc-phosphated metal sheet at 270V for 2 minutes. The films are stored at 175° C. for 20 minutes. For carrying out the 360 hour ASTM salt spray test, the deposition was performed at 250V on untreated sheet steel. The deposition results are summarized in the following Table 1.

TABLE 1

| Electro-dipping primer from binder dispersion | \multicolumn{6}{c}{Deposition results} | | | | | |
|---|---|---|---|---|---|---|
| | I | II | III | IV | V | Comparison[1] |
| Coating thickness [μm] | 20 | 22 | 20 | 22 | 21 | 22 |
| MIBK test[2] | 0 | 0 | 0 | 0 | 0 | 1 |
| Flow[3] | 1.5 | 1.0 | 1.0 | 1.5 | 2 | 2 |
| Reverse impact (in lb) | 50 | 50 | 60 | 70 | 40 | 10 |
| Bending on a conical mandrel in accordance with the ISO standard (in cm) | 2 | 1 | 2 | 1 | 2 | 4 |

[1] Like electro-dipping primers I to V but without adduct containing urethane groups
[2] 20 double strokes with a cotton-wool pad soaked with methyl isobutyl ketone; 0 = best value; 5 = poorest value
[3] 1 = best value; 5 = poorest value

We claim:

1. A process for coating an electrically conductive substrate in which (1) the electrically conductive substrate is dipped into an aqueous electro-dipping primer, (2) the substrate is connected as the cathode, (3) a film is deposited on the substrate by direct current, (4) the coated substrate is removed from the electro-dipping primer, and (5) the film coat deposited is stoved, which comprises a procedure in which the aqueous electro-dipping primer contains a cationic, amine-modified epoxy resin and an at least partly protonated adduct containing urethane groups which is obtained by reacting with one another (A) a polyol selected from the group consisting of a polyether polyol, polyester polyol and mixtures thereof, having a number average molecular weight of 400 to 5000, (B) at least one polyisocyanate, and (C) a compound which contains a hydroxyl group and at least one ketimine group in the molecule or a mixture of such compounds, and at least partly protonating the primary amino groups formed after hydrolysis of the ketimine groups, the adduct being obtained by reacting with one another components (A), (B) and (C) in proportions such that 0.75 to 1.5 equivalents of hydroxyl groups are present per equivalent of isocyanate groups.

2. A process as claimed in claim 1, wherein the adduct is obtainable by employing a diol, selected from the group consisting of polyether diol, a polyester diol and mixtures thereof as component (A) and at least one diisocyanate as component (B).

3. A process as claimed in claim 1, wherein the adduct is obtainable by reacting with one another components (A), (B) and (C) in proportions such that 0.9 to 1.1 and preferably 1.0 equivalents of hydroxyl groups are present per equivalent of isocyanate groups.

4. An aqueous coating composition which contains a cationic, amine-modified epoxy resin and an at least partly protonated adduct containing urethane groups which is obtained by reacting with one another (A) a polyol selected from the group consisting of a polyether polyol, polyester polyol and mixtures thereof, having a number average molecular weight of 400 to 5000, (B) at least one polyisocyanate, and (C) a compound which contains a hydroxyl group and at least one ketimine group in the molecule or a mixture of such compounds, and at least partly protonating the primary amino groups formed after hydrolysis of the ketimine groups, the adduct being obtained by reacting with one another components (A), (B) and (C) in proportions such that 0.75 to 1.5 equivalents of hydroxyl groups are present per equivalent of isocyanate groups.

5. A coating composition as claimed in claim 4, wherein the adduct is obtainable by employing a diol, selected from the group consisting of a polyether diol, a polyester diol and a mixture thereof as component (A) and at least one diisocyanate as component (B).

6. A coating composition as claimed in claim 4, wherein the adduct is obtained by reacting with one another components (A), (B) and (C) in proportions such that 0.9 to 1.1 equivalents of hydroxyl groups are present per equivalent of isocyanate groups.

* * * * *